US008627298B2

(12) United States Patent
Kaplinger et al.

(10) Patent No.: US 8,627,298 B2
(45) Date of Patent: Jan. 7, 2014

(54) USING APPROPRIATE LEVEL OF CODE TO BE EXECUTED IN RUNTIME ENVIRONMENT USING METADATA DESCRIBING VERSIONS OF RESOURCES BEING USED BY CODE

(75) Inventors: Todd E. Kaplinger, Durham, NC (US); Stephen J. Kenna, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 942 days.

(21) Appl. No.: 12/637,207

(22) Filed: Dec. 14, 2009

(65) Prior Publication Data

US 2011/0145801 A1 Jun. 16, 2011

(51) Int. Cl.
*G06F 9/45* (2006.01)
(52) U.S. Cl.
USPC .......................................................... 717/145
(58) Field of Classification Search
USPC .................................. 717/136–137, 140–161
See application file for complete search history.

(56) References Cited

U.S. PATENT DOCUMENTS

| 7,577,951 | B2 | 8/2009 | Partamian et al. |
| 2007/0220481 | A1 | 9/2007 | Gabel et al. |
| 2008/0134156 | A1 | 6/2008 | Osminer et al. |
| 2008/0256510 | A1 | 10/2008 | Auerbach |
| 2009/0119651 | A1 | 5/2009 | Slattery |
| 2009/0271772 | A1 | 10/2009 | Stephenson et al. |
| 2011/0145801 | A1 | 6/2011 | Kaplinger et al. |
| 2012/0159439 | A1* | 6/2012 | Kaplinger et al. ............ 717/121 |

FOREIGN PATENT DOCUMENTS

WO 2008087633 A2 7/2008

OTHER PUBLICATIONS

Office Action from U.S. Appl. No. 13/405,276 dated Jul. 30, 2012.
Bond et al., "Tomcat Kick Start," Chapter 5—Basic Principles of JSPs, http://java.sun.com/developer/Books/javaserverpages/tomcat/index.html, pp. 77-96, Jun. 2003.
Ball et al., "The Java EE 5 Tutorial," Sun Microsystems, Inc., Chapters 2-13, pp. 35-481, Jun. 2006.
Final Office Action from U.S. Appl. No. 13/405,276 dated Nov. 21, 2012.

* cited by examiner

*Primary Examiner* — Ted T Vo
(74) *Attorney, Agent, or Firm* — Robert A. Voigt, Jr.; Winstead, P.C.

(57) ABSTRACT

A system and computer program product for using an appropriate level of code to be executed in a runtime environment. Code in a non-Java format is translated into a Java source file. During the translation process, metadata is generated from a configuration file where the metadata includes version information of the resources (e.g., JSTL) being used by the code written in the non-Java format. A determination is made as to whether to recompile the non-Java code based on software components, referred herein as "listener components," determining whether the versions of the resources being used by the non-Java code performs acceptably well in the runtime environment. If a listener component determines that a version of a resource being used is not acceptable, then the non-Java code is recompiled with a newer version of the resource. In this manner, an appropriate level of code is executed by the runtime environment.

24 Claims, 4 Drawing Sheets

USING APPROPRIATE LEVEL OF CODE TO BE EXECUTED IN RUNTIME ENVIRONMENT USING METADATA DESCRIBING VERSIONS OF RESOURCES BEING USED BY CODE

TECHNICAL FIELD

The present invention relates to tools for computer software development, and more particularly to using the appropriate level of code to be executed in a runtime environment using metadata describing versions of resources being used by the code.

BACKGROUND OF THE INVENTION

Currently, there are many technologies that allow developers to write code in a non-Java format (e.g., a scripting language such as JavaServer Pages (JSP) or Groovy, Web Services Description Language (WSDL), Enterprise JavaBeans (EJB)) which is translated into a Java source file. The Java source file may be compiled by a compiler into what is known as Java bytecodes, which are stored in a binary class file. Java bytecodes refer to an intermediate language that is later executed by a runtime program, such as a Java Virtual Machine (JVM).

During the translation process described above, the Java source code may be generated using particular versions of resources or technologies. For example, JSP may use the ISP Standard Tag Library (JSTL) resource. JSTL refers to a set of software routines that are used in JSP pages by referencing them with tags. In another example, JSP may use the JavaServerFaces (JSF) framework. JSF is a framework for building user interfaces for Java applications. Oftentimes, the generated Java source code is kept in binary format and used on future versions of these resources and technologies, including the future versions of the runtime environment (e.g., version of the runtime program).

However, the specifications for these software resources, technologies and runtime environments are constantly being updated and revised. Additional functionality and features may be deployed. Particular code may no longer be needed. As a result, the Java source code used on future versions of these resources, technologies and runtime environments may not be the most efficient in terms of performance.

BRIEF SUMMARY OF THE INVENTION

In one embodiment of the present invention, a computer program product embodied in a computer readable storage medium for using an appropriate level of code to be executed in a runtime environment comprises the programming instructions for translating code from a first format into a source file of a second format. The computer program product further comprises the programming instructions for generating metadata during the translation to include version information of one or more resources used by the code of the first format. Furthermore, the computer program product comprises the programming instructions for storing the generated metadata in a file. Additionally, the computer program product comprises the programming instructions for compiling the source file of the second format. In addition, the computer program product comprises the programming instructions for storing the compiled source file of the second format in the file. Further, the computer program product comprises the programming instructions for loading the file in a memory. Furthermore, the computer program product comprises the programming instructions for registering the loading with one or more listener components, where each of the one or more listener components determines a version of a particular resource being used by the code of the first format. In addition, the computer program product comprises the programming instructions for recompiling the code of the first format if one of the one or more listener components indicates that a version of a first resource being used by the code of the first format is not acceptable to be used by a runtime environment. The code of the first format is recompiled using a newer version of the first resource.

In another embodiment of the present invention, a computer program product embodied in a computer readable storage medium for using an appropriate level of code to be executed in a runtime environment comprises the programming instructions for translating code from a first format into a source file of a second format. The computer program product further comprises the programming instructions generating metadata during the translation to include version information of one or more resources used by the code of the first format. Furthermore, the computer program product comprises the programming instructions for storing the generated metadata in a file. Additionally, the computer program product comprises the programming instructions for compiling the source file of the second format. Further, the computer program product comprises the programming instructions for storing the compiled source file of the second format in the file. In addition, the computer program product comprises the programming instructions for recompiling the code in the first format using versions of resources to be implemented by a runtime environment. Furthermore, the computer program product comprises the programming instructions for evaluating performance of the recompiled code. In addition, the computer program product comprises the programming instructions for executing the recompiled code by a runtime program of the runtime environment if the performance exceeds a threshold.

Other forms of the embodiments of the computer program product described above are in a system.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE SEVERAL VIEWS OF THE DRAWING

A better understanding of the present invention can be obtained when the following detailed description is considered in conjunction with the following drawings, in which.

DETAILED DESCRIPTION OF THE INVENTION

Figure 1:
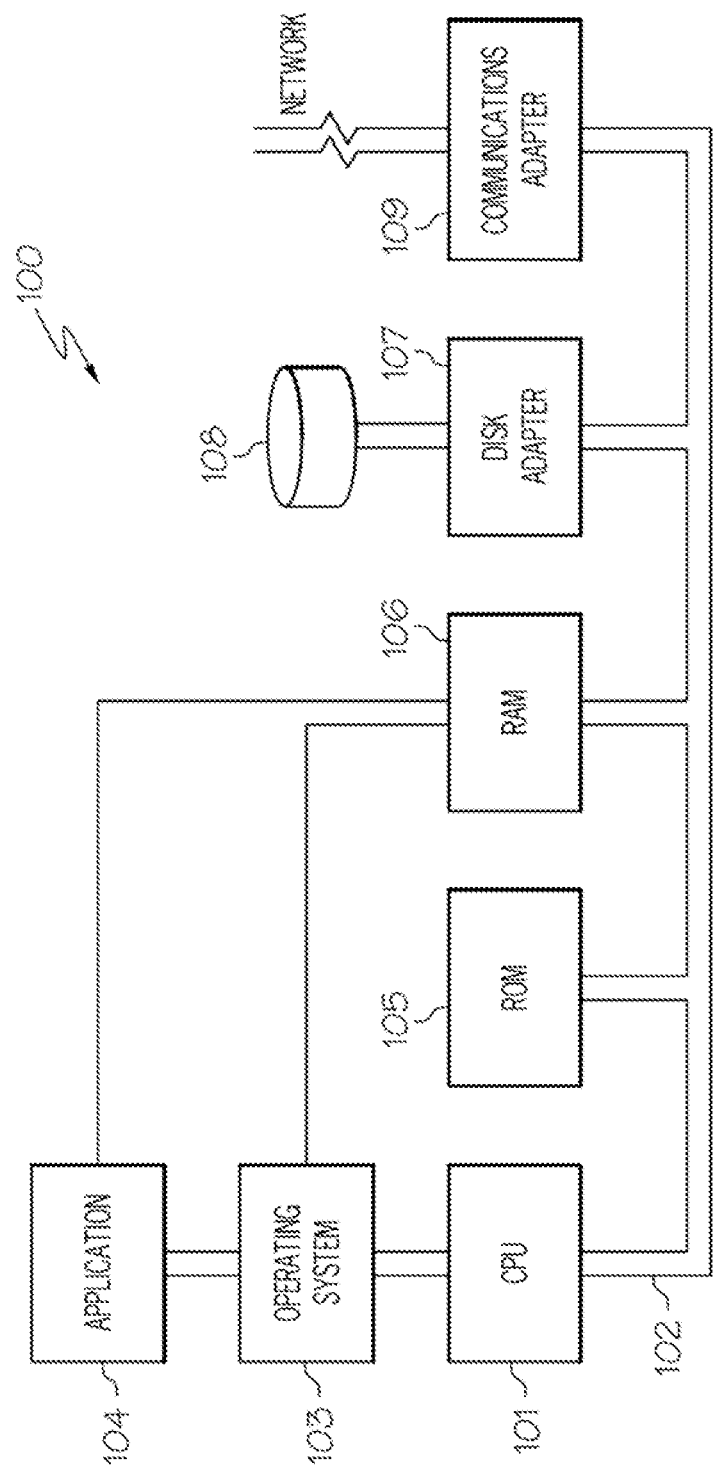
FIG. 1 is a hardware configuration of a computer system configured in accordance with an embodiment of the present invention.

The present invention comprises a method, system and computer program product for using an appropriate level of code to be executed in a runtime environment. In one embodiment of the present invention, code in a first format, such as a scripting language code, is translated into a Java source file. During the translation process, metadata is generated from a configuration file (e.g., tag library descriptor file) where the metadata includes version information of the resources (e.g., JSTL) being used by the code written in the first format. A determination is made as to whether to recompile the code written in the first format based on software components, referred herein as "listener components," determining whether the versions of the resources being used by the code written in the first format performs acceptably well in the runtime environment. If a listener component determines that a version of a resource being used is not acceptable, then the code written in the first format is recompiled with a newer version of the resource. Alternatively, the code written in the first format may be automatically recompiled using the latest versions of the resources to be implemented by the runtime environment. The performance of the recompiled code is then evaluated. If the performance exceeds a threshold, then the recently recompiled code is executed by the runtime environment. Otherwise, the earlier version of the compiled Java source file is executed by the runtime environment. In this manner, an appropriate level of code is executed by the runtime environment.

While the following discusses the present invention in connection with translating a scripting language, such as JSP, into a Java source file implementing Java components, the principles of the present invention may be implemented to translate code from any format to a different format. For example, the principles of the present invention may be implemented in connection with translating WSDL or EJBs into code that is interpreted and then compiled, such as Java source files. A person of ordinary skill in the art would be capable of applying the principles of the present invention to such implementations. Further, embodiments applying the principles of the present invention to such implementations would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

FIG. 1—Hardware Configuration of Computer System

FIG. 1 illustrates an embodiment of a hardware configuration of a computer system 100 which is representative of a hardware environment for practicing the present invention. Referring to FIG. 1, computer system 100 may have a processor 101 coupled to various other components by system bus 102. An operating system 103 may run on processor 101 and provide control and coordinate the functions of the various components of FIG. 1. An application 104 in accordance with the principles of the present invention may run in conjunction with operating system 103 and provide calls to operating system 103 where the calls implement the various functions or services to be performed by application 104. Application 104 may include, for example, an application server configured to use an appropriate level of code to be executed in a runtime environment as discussed further below in association with FIGS. 3 and 4. A more detail description of the application server is provided below in connection with FIG. 2.

Referring again to FIG. 1, read-only memory ("ROM") 105 may be coupled to system bus 102 and include a basic input/output system ("BIOS") that controls certain basic functions of computer device 100. Random access memory ("RAM") 106 and disk adapter 107 may also be coupled to system bus 102. It should be noted that software components including operating system 103 and application 104 may be loaded into RAM 106, which may be computer system's 100 main memory for execution. Disk adapter 107 may be an integrated drive electronics ("IDE") adapter that communicates with a disk unit 108, e.g., disk drive. It is noted that the program for using an appropriate level of code to be executed in a runtime environment, as discussed further below in association with FIGS. 3 and 4, may reside in disk unit 108 or in application 104.

Computer system 100 may further include a communications adapter 109 coupled to bus 102. Communications adapter 109 may interconnect bus 102 with an outside network (not shown) thereby allowing computer system 100 to communicate with other similar devices.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the function/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the function/acts specified in the flowchart and/or block diagram block or blocks.

As stated in the Background section, during the translation of code written in a non-Java format (e.g., scripting language such as JSP) into a Java source file, the Java source code may be generated using particular versions of resources or technologies. For example, JSP uses the JSTL resource. In another example, JSP uses the JSF framework. Oftentimes, the generated Java source code is kept in binary format and used on future versions of these resources and technologies, including the future versions of the runtime environment (e.g., version of runtime program). However, the specifications for these software resources, technologies and runtime environments are constantly being updated and revised. Additional functionality and features may be deployed. Particular code may no longer be needed. As a result, the Java source code used on future versions of these resources, technologies and runtime environments may not be the most efficient in terms of performance.

Figure 2:
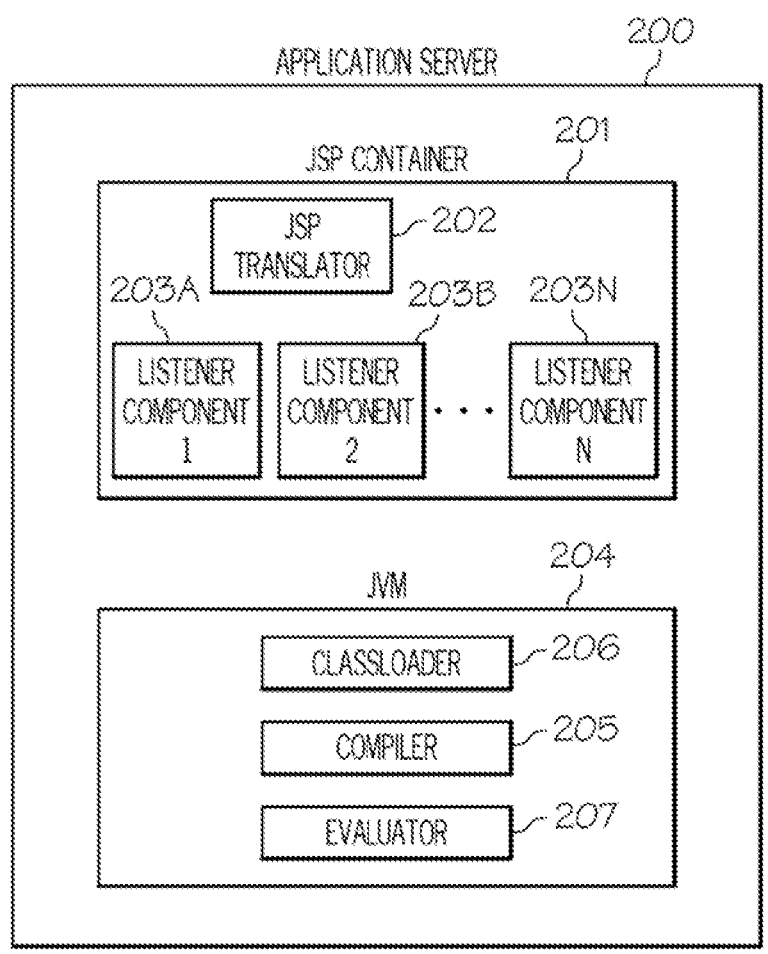
FIG. 2 illustrates the software components of an application server in accordance with an embodiment of the present invention.
Figure 3:
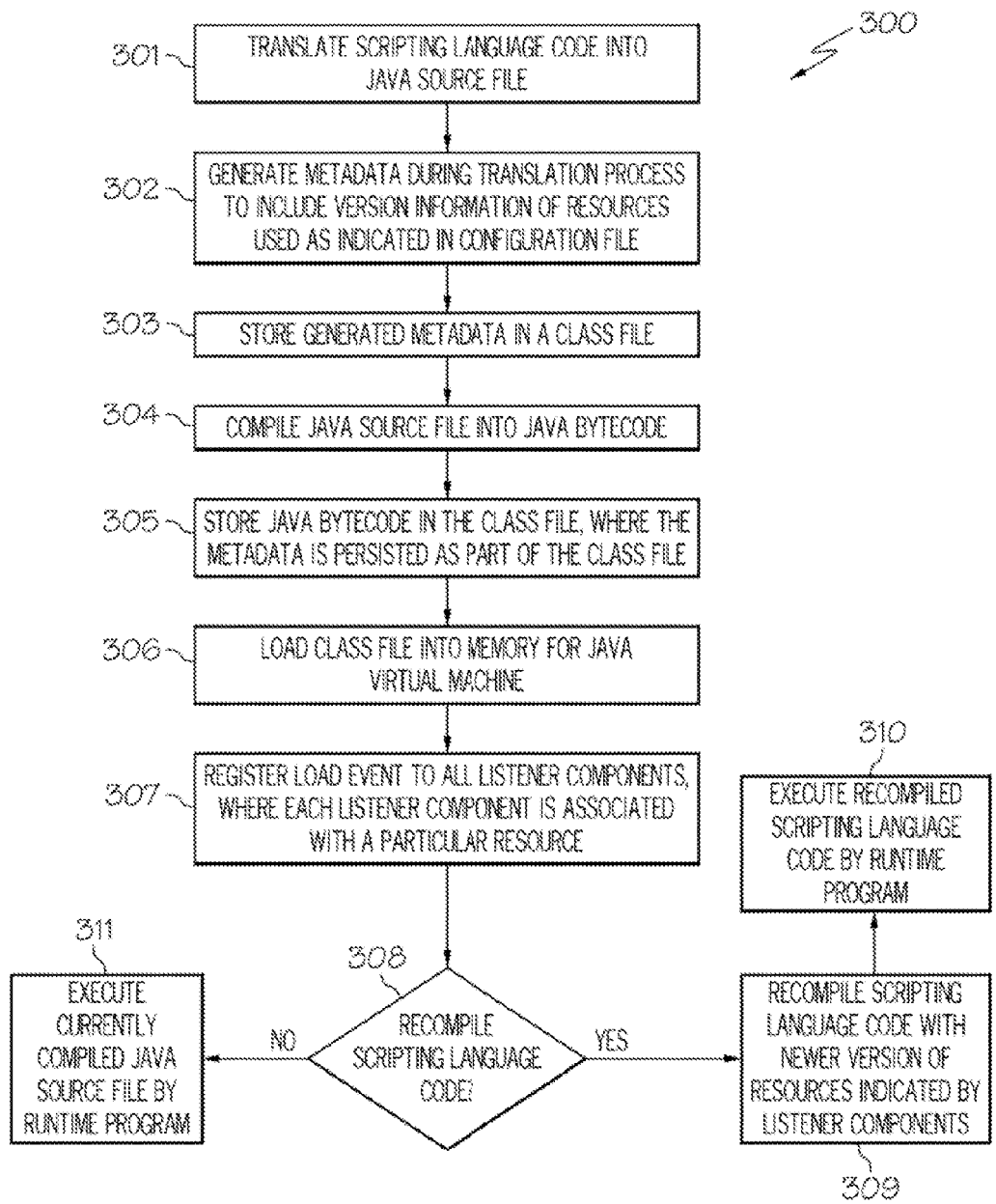
FIG. 3 is a flowchart of a method for using an appropriate level of code to be executed in a runtime environment.
Figure 4:
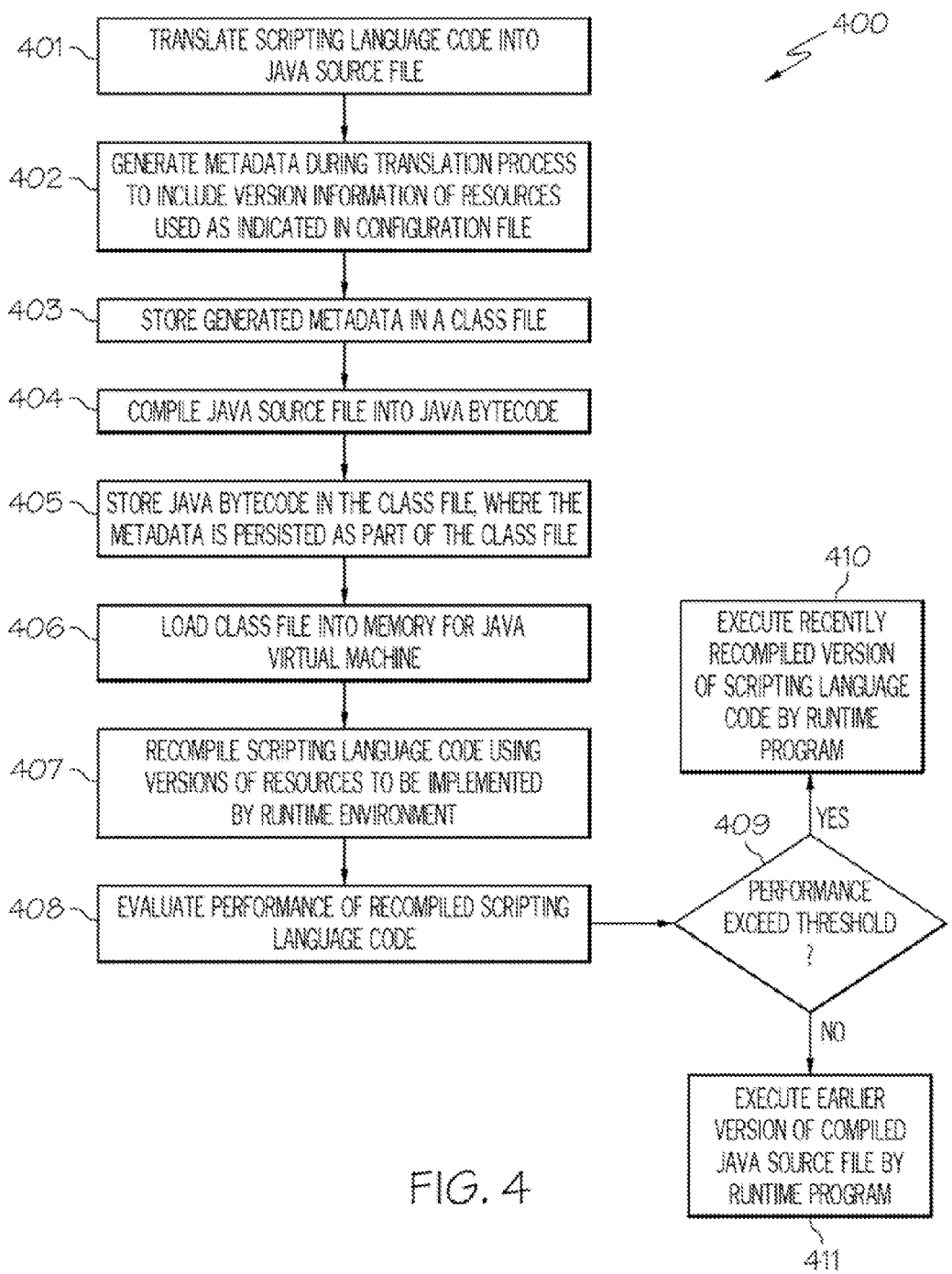
FIG. 4 is a flowchart of an alternative method for using an appropriate level of code to be executed in a runtime environment.

The principles of the present invention provide a technique for using an appropriate level of code (i.e., using code with the appropriate resources that is sufficiently efficient in terms of performance) to be executed in a runtime environment as discussed below in connection with FIGS. 2-4. FIG. 2 illustrates an application server with software components used in determining an appropriate level of code to be executed in a runtime environment. FIG. 3 is a flowchart of a method for using an appropriate level of code to be executed in a runtime environment. FIG. 4 is a flowchart of an alternative method for using an appropriate level of code to be executed in a runtime environment.

A description of the software components of the application server for practicing the principles of the present invention is provided below in connection with FIG. 2.

FIG. 2—Software Components of Application Server

FIG. 2 illustrates an embodiment of the present invention of an application server 200 configured to use an appropriate level of code to be executed in a runtime environment as discussed further below in association with FIGS. 3 and 4. Referring to FIG. 2, application server 200 includes a container 201, such as a JavaServer Page (JSP) container. Container 201 may refer to software that acts as a parent program to hold and execute other software routines. In one embodiment, container 201 includes a translator 202 (e.g., JSP translator) configured to translate code written in a non-Java format (e.g., a scripting language such as JavaServer Pages. (JSP) or Groovy, Web Services Description Language (WSDL), Enterprise JavaBeans (EJB)) into a Java source file. Translator 202 is further configured to generate metadata during the translation process which is used to determine an appropriate level of code to be executed in a runtime environment as discussed below in connection with FIGS. 3 and 4. Metadata may refer to data that describes other data. In one embodiment, metadata is used to describe the versions of resources being used by the code written in a non-Java format. It is noted that the term "resources" used herein refers to at least resources, technologies and frameworks. Examples of resources, though not limiting, include a component library, such as JSTL and JSF.

JSP container 201 further includes software components referred to herein as listener components 203A-N. Listener components 203A-N may collectively or individually be referred to as listener components 203 or listener component 203, respectively. While FIG. 2 illustrates N number of listener components 203, JSP container 201 may contain zero or more number of listener components 203.

Listener components 203 are used to determine if the version of the resource being used by the code written in the non-Java format performs acceptably well in the runtime environment as discussed below in connection with FIGS. 3 and 4. Each listener component 203 is associated with a particular resource. For example, listener component 203A may be associated with the JSTL resource and listener component 203B may be associated with the JSF resource. In this manner, listener component 203A determines the version of the JSTL resource being used and whether that version is satisfactory to be executed by the runtime environment. Similarly, listener component 203B determines the version of the JSF resource being used and whether that version is satisfactory to be executed by the runtime environment. In one embodiment, listener component 203 determines whether the version of its associated resource performs acceptably well to be used by the runtime environment from a performance perspective. For example, metrics, such as requests per second that a server can handle, memory consumption, thread usage, and so forth, may be used. In one embodiment, application server 200 can define the criteria to be used by listener component 203 for determining what should be considered acceptable performance.

Additionally, application server 200 includes a Java Virtual Machine (JVM) 204. JVM 204 includes a compiler 205 configured to compile the Java source file into Java bytecodes which are stored in a binary class file. Java bytecodes refer to an intermediate language that is later Converted into machine language and executed by JVM 204.

Furthermore, JVM 204 includes a software component, referred to herein as the classloader 206, configured to load Java classes into JVM 204.

In addition, JVM 204 includes a software component, referred to herein as the evaluator 207, configured to evaluate the performance of the recompiled code written in the non-Java format (e.g., scripting language code) as discussed below in connection with FIG. 4.

While FIG. 2 illustrates the use of application server 200 using software components to convert JSPs into Java bytecodes to be executed by a JVM, the principles of the present invention are not to be limited to converting JSPs to Java bytecodes. The principles of the present invention may be implemented to convert code from any format to a different format. For example, the principles of the present invention may be applied for translating WSDL or EJBs into code that is interpreted and then compiled. A person of ordinary skill in the art would be capable of applying the principles of the present invention to such implementations. Further, embodiments applying the principles of the present invention to such implementations would fall within the scope of the present invention.

A discussion of an embodiment for using an appropriate level of code to be executed in a runtime environment is provided below in connection with FIG. 3.

FIG. 3—Method for Using an Appropriate Level of Code to be Executed in a Runtime Environment FIG. 3 is a flowchart of a method 300 for using an appropriate level of code to be executed in a runtime environment in accordance with an embodiment of the present invention.

Referring to FIG. 3, in conjunction with FIGS. 1 and 2, in step 301, translator 202 translates code written in a scripting language (e.g., JSP, Groovy) into a Java source file.

In step 302, translator 202 generates metadata during the translation process of step 301 to include version information of the resources (e.g., a component library such as JSTL) used by the code written in the scripting language. In one embodiment, the version information acquired by translator 202 is stored in a configuration file, such as a tag library descriptor as illustrated below. A tag library descriptor may refer to an XML document that contains information about a library as a whole and about each tag contained in the library.

An example portion of a tag library descriptor from JSTL is shown below:

```
<taglib xmlns=http://java.sun.com/xml/ns/javaee"
    xmlns:xsi=http://www.w3.org/2001/XMLSchema-instance
    xsi:schemaLocation="http://java.sun.com/xml/ns/javaee
http://java.sun.com/xml/ns/javaee/web-jsptaglibrary_2_1.xsd"
    version="2.1">
    <description>JSTL 1.2 core library<description>
    <display-name>JSTL_core</display-name>
    <tlib-version>1.2</tlib-version>
    <short-name>c</short-name>
    <uri>http://java.sun.com/jsp/jstl/core</uri>
```

Translator 202 would then generate the following metadata based on the information provided in the tag library descriptor shown above:

```
private static Map_jspx_versionInfo = new
HashMap<String,<Map<String,String>>;
    static{
        _jspx_versionInfo.put ( "version", "6.0");
        Map_tldInfo = new HashMap<String,String>( );
        tldInfo.put ("JSTL core", "1.2");
        _jspx_versionInfo.put (http://java.sun.com/jsp/jstl/core,
        _tldInfo);_
    }
```

In this example, translator 202 indicates that the version of JSTL being used is version 1.2.

In step 303, translator 202 stores the metadata generated in step 302 in a class file. In one embodiment, the class file is stored in memory, such as memory 106.

In step 304, compiler 205 compiles the Java source file into a Java bytecode. In step 305, compiler 205 stores the Java bytecode in the class file, where the metadata is persisted as part of the class file.

In step 306, classloader 206 loads the class file into memory, such as memory 106, for JVM 204.

In step 307, classloader 206 registers the load event to all listener components 203, where each listener component 203 is associated with a particular resource.

In step 308, a determination is made as to whether to recompile the scripting language code. This determination is based on listener components 203 determining whether the version of the resources being used by the scripting language code is acceptable to be used by the runtime environment. As stated above, each listener component 203 (e.g., listener component 203A) is associated with a particular resource (e.g., JSTL). Each listener component 203 determines the version of its associated resource being used by the scripting language code and determines whether this version is acceptable to be used by the runtime environment, such as from a performance perspective. If a listener component 203 determines that the version of its associated resource being used is not acceptable, then an indication to recompile the scripting language code with the newer version of the resource is generated by listener component 203.

If an indication is received from a listener component 203 that the scripting language code needs to be recompiled, then, in step 309, the scripting language code is recompiled with the newer version of the resources indicated by listener components 203.

In step 310, the recompiled scripting language code is executed by the runtime program, such as JVM 204.

If, however, there are no indications received from listener components 203 that the scripting language code needs to be recompiled, then, in step 311, the currently compiled Java source file is executed by the runtime program, such as JVM 204.

Method 300 may include other and/or additional steps that, for clarity, are not depicted. Further, method 300 may be executed in a different order presented and that the order presented in the discussion of FIG. 3 is illustrative. Additionally, certain steps in method 300 may be executed in a substantially simultaneous manner or may be omitted.

An alternative method for using an appropriate level of code to be executed in a runtime environment is provided below in connection with FIG. 4.

FIG. 4—Alternative Method for Using an Appropriate Level of Code to be Executed in a Runtime Environment FIG. 4 is a flowchart of an alternative method 400 for using an appropriate level of code to be executed in a runtime environment in accordance with an embodiment of the present invention.

Referring to FIG. 4, in conjunction with FIGS. 1 and 2, in step 401, translator 202 translates code written in a scripting language (e.g., JSP, Groovy) into a Java source file.

In step 402, translator 202 generates metadata during the translation process of step 401 to include version information of the resources (e.g., a component library such as JSTL) used by the code written in the scripting language. In one embodiment, the version information acquired by translator 202 is stored in a configuration file, such as a tag library descriptor as illustrated above.

In step 403, translator 202 stores the metadata generated in step 402 in a class file. In one embodiment, the class file is stored in memory, such as memory 106.

In step 404, compiler 205 compiles the Java source file into a Java bytecode. In step 405, compiler 205 stores the Java bytecode in the class file, where the metadata is persisted as part of the class file.

In step 406, classloader 206 loads the class file into memory, such as memory 106, for JVM 204.

In step 407, the scripting language code is recompiled by compiler 205 using versions of the resources (which may be later versions in comparison to the versions of the resources used in the translation process of step 401) to be implemented by the runtime environment. In one embodiment, the recompiled scripting language code is stored in memory, such as memory 106.

In step 408, the performance of the recompiled code is evaluated by evaluator 207. For example, a website may now be able to handle ten (10) times the number of users with the recompiled code using the latest versions of the resources to be implemented by the runtime environment. In another example, the recompiled code may use less memory. These examples are not to be limiting to the type of performance metrics that may be used to evaluate the recompiled code by evaluator 207.

In step 409, a determination is made by evaluator 207 as to whether the performance of the recompiled scripting language code exceeds a threshold. A "threshold," as used herein, may include any type of performance metric whose level of performance indicates that the recompiled code should be executed by the runtime program.

If the performance of the recompiled scripting language code exceeds the threshold, then, in step 410, the recently recompiled version of the scripting language code is executed by the runtime program such as JVM 204.

If, however, the performance of the recompiled scripting language code does not exceed the threshold, then, in step 411, the earlier version of the compiled Java source file is executed by the runtime program, such as JVM 204.

Method 400 may include other and/or additional steps that, for clarity, are not depicted. Further, method 400 may be executed in a different order presented and that the order presented in the discussion of FIG. 4 is illustrative. Additionally, certain steps in method 400 may be executed in a substantially simultaneous manner or may be omitted.

Although the method, system and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A computer program product embodied in a computer readable storage medium for using an appropriate level of code to be executed in a runtime environment, the computer program product comprising the programming instructions for:
   translating code from a first format into a source file of a second format;
   generating metadata during said translation to include version information of one or more resources used by said code of said first format;
   storing said generated metadata in a file;
   compiling said source file of said second format;
   storing said compiled source file of said second format in said file;
   loading said file in a memory;
   registering said loading with one or more listener components, wherein each of said one or more listener components determines a version of a particular resource being used by said code of said first format; and
   recompiling said code of said first format if one of said one or more listener components indicates that a version of a first resource being used by said code of said first format is not acceptable to be used by a runtime environment, wherein said code of said first format is recompiled using a newer version of said first resource.

2. The computer program product as recited in claim 1, wherein said code of said first format comprises scripting language code.

3. The computer program product as recited in claim 2, wherein said source file of said second format comprises code that is interpreted and then compiled.

4. The computer program product as recited in claim 1 further comprising the programming instructions for:
   executing said recompiled code of said first format by a runtime program.

5. The computer program product as recited in claim 1, wherein said version information of resources used by said code of said first format is stored in a configuration file.

6. The computer program product as recited in claim 1 further comprising the programming instructions for:
   executing said compiled source file of said second format if none of said one or more listener components indicates that a version of a resource being used by said code of said first format is not acceptable to be used by said runtime environment.

7. The computer program product as recited in claim 1, wherein said first resource comprises a component library.

8. A computer program product embodied in a computer readable storage medium for using an appropriate level of code to be executed in a runtime environment, the computer program product comprising the programming instructions for:
   translating code from a first format into a source file of a second format;
   generating metadata during said translation to include version information of one or more resources used by said code of said first format;
   storing said generated metadata in a file;
   compiling said source file of said second format;
   storing said compiled source file of said second format in said file;
   recompiling said code in said first format using versions of resources to be implemented by a runtime environment;

evaluating performance of said recompiled code; and executing said recompiled code by a runtime program of said runtime environment if said performance exceeds a threshold.

9. The computer program product as recited in claim 8, wherein said code of said first format comprises scripting language code.

10. The computer program product as recited in claim 9, wherein said source file of said second format comprises code that is interpreted and then compiled.

11. The computer program product as recited in claim 8 further comprising the programming instructions for:

executing said compiled source file of said second format by said runtime program of said runtime environment if said performance does not exceed said threshold.

12. The computer program product as recited in claim 8, wherein said resources comprise a component library.

13. A system, comprising:

a memory unit for storing a computer program for using an appropriate level of code to be executed in a runtime environment; and a processor coupled to said memory unit, wherein said processor, responsive to said computer program, comprises:

circuitry for translating code from a first format into a source file of a second format;

circuitry for generating metadata during said translation to include version information of one or more resources used by said code of said first format;

circuitry for storing said generated metadata in a file;

circuitry for compiling said source file of said second format;

circuitry for storing said compiled source file of said second format in said file;

circuitry for loading said file in a memory;

circuitry for registering said loading with one or more listener components, wherein each of said one or more listener components determines a version of a particular resource being used by said code of said first format; and circuitry for recompiling said code of said first format if one of said one or more listener components indicates that a version of a first resource being used by said code of said first format is not acceptable to be used by a runtime environment, wherein said code of said first format is recompiled using a newer version of said first resource.

14. The system as recited in claim 13, wherein said code of said first format comprises scripting language code.

15. The system as recited in claim 14, wherein said source file of said second format comprises code that is interpreted and then compiled.

16. The system as recited in claim 13, wherein said processor further comprises:

circuitry for executing said recompiled code of said first format by a runtime program.

17. The system as recited in claim 13, wherein said version information of resources used by said code of said first format is stored in a configuration file.

18. The system as recited in claim 13, wherein said processor further comprises:

circuitry for executing said compiled source file of said second format if none of said one or more listener components indicates that a version of a resource being used by said code of said first format is not acceptable to be used by said runtime environment.

19. The system as recited in claim 13, wherein said first resource comprises a component library.

20. A system, comprising:

a memory unit for storing a computer program for using an appropriate level of code to be executed in a runtime environment; and a processor coupled to said memory unit, wherein said processor, responsive to said computer program, comprises:

circuitry for translating code from a first format into a source file of a second format;

circuitry for generating metadata during said translation to include version information of one or more resources used by said code of said first format;

circuitry for storing said generated metadata in a file;

circuitry for compiling said source file of said second format;

circuitry for storing said compiled source file of said second format in said file;

circuitry for recompiling said code in said first format using versions of resources to be implemented by a runtime environment;

circuitry for evaluating performance of said recompiled code; and circuitry for executing said recompiled code by a runtime program of said runtime environment if said performance exceeds a threshold.

21. The system as recited in claim 20, wherein said code of said first format comprises scripting language code.

22. The system as recited in claim 21, wherein said source file of said second format comprises code that is interpreted and then compiled.

23. The system as recited in claim 20, wherein said processor further comprises:

circuitry for executing said compiled source file of said second format by said runtime program of said runtime environment if said performance does not exceed said threshold.

24. The system as recited in claim 20, wherein said resources comprise a component library.

* * * * *